US009635187B2

(12) United States Patent
Gore et al.

(10) Patent No.: US 9,635,187 B2
(45) Date of Patent: Apr. 25, 2017

(54) CALL SETUP PENALTY COST CATEGORIZATION

(75) Inventors: Michelle Gore, Arvada, CO (US); Jose Antonio Gonzalez, Jersey City, NJ (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 2177 days.

(21) Appl. No.: 12/500,533

(22) Filed: Jul. 9, 2009

(65) Prior Publication Data

US 2011/0007880 A1 Jan. 13, 2011

(51) Int. Cl.
*H04M 1/24* (2006.01)
*H04M 15/00* (2006.01)

(52) U.S. Cl.
CPC .......... *H04M 15/00* (2013.01); *H04M 15/41* (2013.01); *H04M 15/58* (2013.01); *H04M 15/73* (2013.01); *H04M 15/8044* (2013.01); *H04M 15/8055* (2013.01); *H04M 15/8061* (2013.01)

(58) Field of Classification Search
USPC ............................................ 379/114.01–132
See application file for complete search history.

(56) References Cited

U.S. PATENT DOCUMENTS

| | | | | |
|---|---|---|---|---|
| 5,943,406 A | * | 8/1999 | Leta et al. | 379/120 |
| 6,359,976 B1 | * | 3/2002 | Kalyanpur | H04M 15/00 379/111 |
| 2001/0034704 A1 | * | 10/2001 | Farhat | G06Q 20/02 705/39 |
| 2002/0068546 A1 | * | 6/2002 | Plush et al. | 455/406 |
| 2004/0077331 A1 | * | 4/2004 | King | 455/405 |
| 2005/0094623 A1 | * | 5/2005 | D'Eletto | 370/352 |
| 2007/0036309 A1 | * | 2/2007 | Zoldi et al. | 379/114.14 |
| 2009/0138764 A1 | * | 5/2009 | Barsness | G06Q 30/0283 714/48 |

* cited by examiner

*Primary Examiner* — Duc Nguyen
*Assistant Examiner* — Assad Mohammed

(57) ABSTRACT

Embodiments of systems and methods presently disclosed generally relate to categorizing penalty costs associated with calls. More specifically, embodiments relate to identifying penalty costs generated in response to setting up calls in a network and determining one or more reasons for the penalty costs. Further still, embodiments relate to generating one or more reports of penalty costs. Further yet, embodiments relate to notifying specified personnel of the penalty cost report(s).

15 Claims, 6 Drawing Sheets

CALL SETUP PENALTY COST CATEGORIZATION

COPYRIGHT NOTICE

Contained herein is material that is subject to copyright protection. The copyright owner has no objection to the facsimile reproduction of the patent disclosure by any person as it appears in the Patent and Trademark Office files or records, but otherwise reserves all rights to the copyright whatsoever. Copyright© 2009 Level 3 Communications, LLC.

BACKGROUND

Millions of telephone calls are completed between people around the world every day. The calls are routed, or setup, through communications networks via network elements, such as switches. Network switches route the calls according to configuration settings. Typically, a call can be routed to the destination (e.g., the called number) by a switch via numerous routes. The switch configuration settings dictate which route should be used. The configuration settings are established in advance based on a number of criteria, such as route costs, network vendor relationships (e.g., agreements), government regulations, and others. Typically, although not always, the least cost route is preferred to set up a call.

For any number of reasons, calls may not be routed via the least cost route. When a call is routed via a route other than the least cost route, additional cost is incurred. This additional cost is referred to as a penalty cost. In other words, when a call is routed via a more costly route than the least cost route, an additional cost is incurred (referred to as a penalty cost herein) above the cost that would have been incurred if the call was routed via the least cost route. Communication network administrators and personnel often want to know whether, why, and to what degree, penalty costs are being incurred. Unfortunately, conventional systems are not able to identify and determine reasons for penalty costs.

SUMMARY

Embodiments of systems and methods presently disclosed generally relate to categorizing penalty costs associated with calls. More specifically, embodiments relate to identifying penalty costs generated in response to setting up calls in a network and determining one or more reasons for the penalty costs. Further still, embodiments relate to generating one or more reports of penalty costs with associated reason codes. Further yet, embodiments relate to notifying specified personnel of the penalty cost report(s).

An embodiment of a computer-implemented method for analyzing penalty costs includes retrieving call detail record (CDR) call setup data entries for one or more calls having associated penalty costs, linking selected attribute values of the CDR call setup data entries to supplemental data, generating interim analysis values associated with each CDR call setup data entry, and based on the interim analysis values, generating a reason code for each CDR call setup data entry, wherein the reason code indicates a reason for the associated penalty cost. The computer-implemented method may further include generating a penalty cost report including the reason code for each CDR call setup data entry. Still further the computer-implemented method may include notifying specified network personnel of the penalty cost report. Further still, the supplemental data may include data for classifying attribute values of the CDR call setup data entries. Further yet, the reason codes may classify penalty costs in categories including one or more of blocking, overflow, vendor agreement, or network element misconfiguration.

An embodiment of a system includes an electronic cost routing administrator configured to gather call detail records (CDRs) from one or more network elements in a network and an electronic penalty cost categorization system. The electronic penalty cost categorization system may include a CDR call setup data retrieval and filter system configured to retrieve CDR call setup data from the electronic cost routing administrator and filter the CDR call setup data to include call entries that have associated penalty costs, an analysis module configured to generate interim analysis data characterizing a reason for each penalty cost, and a categorization module configured to use the interim analysis module to generate a reason code indicating the reason for each penalty cost.

In an embodiment of a system the electronic penalty cost categorization system may include a penalty cost report generator configured to generate one or more reports showing the reason codes associated with each penalty cost. Still further, the electronic penalty cost categorization system further may include a notification module configured to notify specified personnel of the one or more reports. Further still, the system may include supplemental data configured for use in classifying selected attribute values of the filtered CDR call setup data. The system may further include a user interface configured to enable a user to specify formats of the one or more penalty cost reports.

An embodiment of a computer program product includes a computer-readable medium storing computer-executable instructions, which, when executed, cause a computer to perform a process. An embodiment of the process includes gathering call detail records (CDRs) from a plurality of network elements, filtering selected data from the CDRs, wherein filtering includes retrieving one or more CDR entries that have an associated penalty cost, linking selected attributes of the retrieved CDR entries to predetermined analysis values relevant to determining reasons for penalty costs, and, based in part on the interim analysis values, categorizing each of the one or more penalty costs according to reason codes indicating reasons for each of the one or more penalty costs.

In an embodiment the computer program product the process further includes generating a report including the one or more penalty costs and their associated reason codes, and sending the report to selected personnel. Still further, the reason codes may indicate reasons selected from a group comprising blocking, overflow, configuration problem, reporting problem and a forced routed. Further still, linking selected attributes to predetermined analysis values may include determining business logic types for the selected attributes. Further yet, the predetermined analysis values may include one or more of vendor type, partition type and jurisdiction type.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

data, determining penalty costs based on the CDR data, and categorizing the penalty costs.

Figure 2:
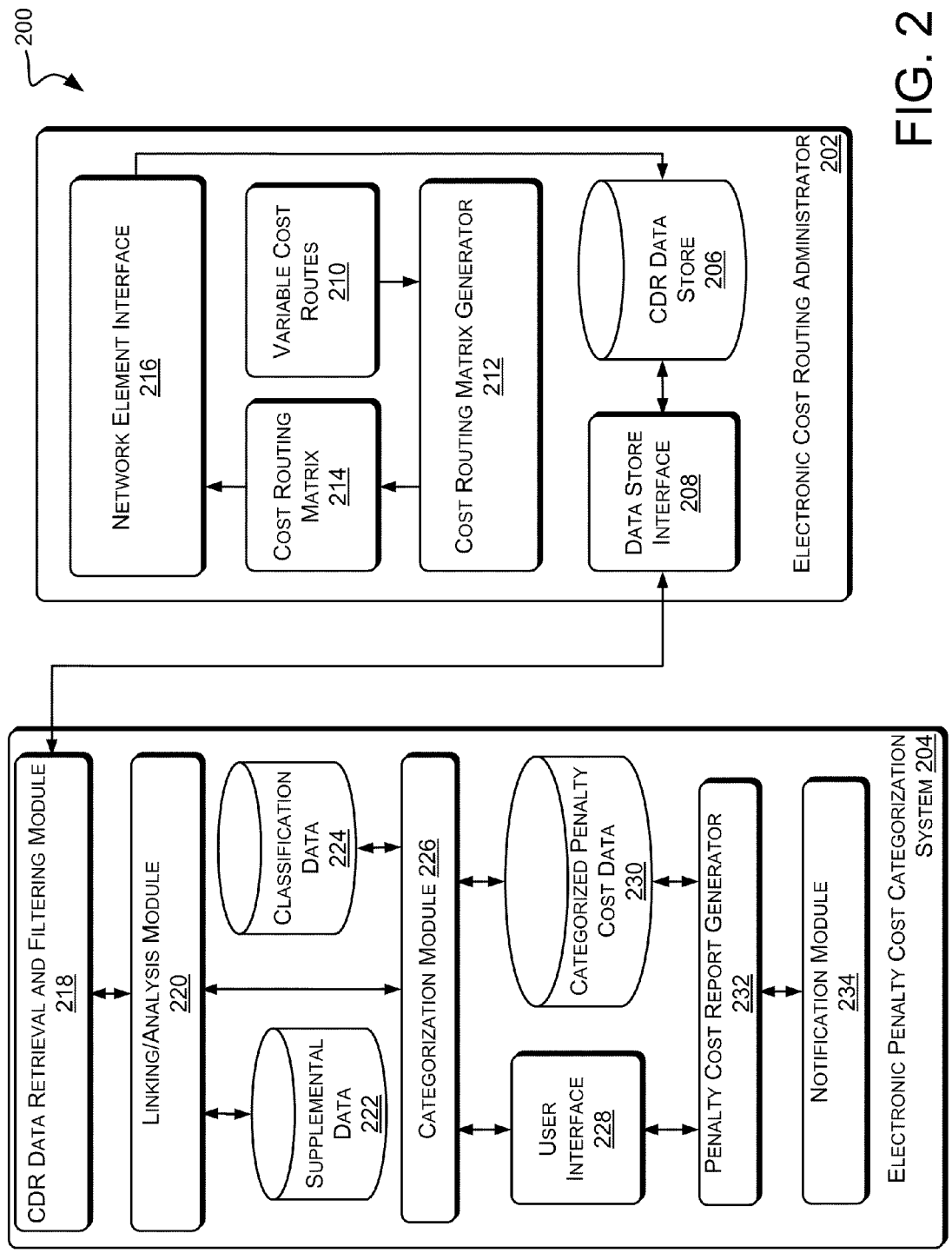

FIG. 2 is a functional module diagram illustrating a system for gathering CDR data, determining penalty costs based on the CDR data, categorizing the penalty costs, and reporting penalty costs with reason codes.

Figure 3:
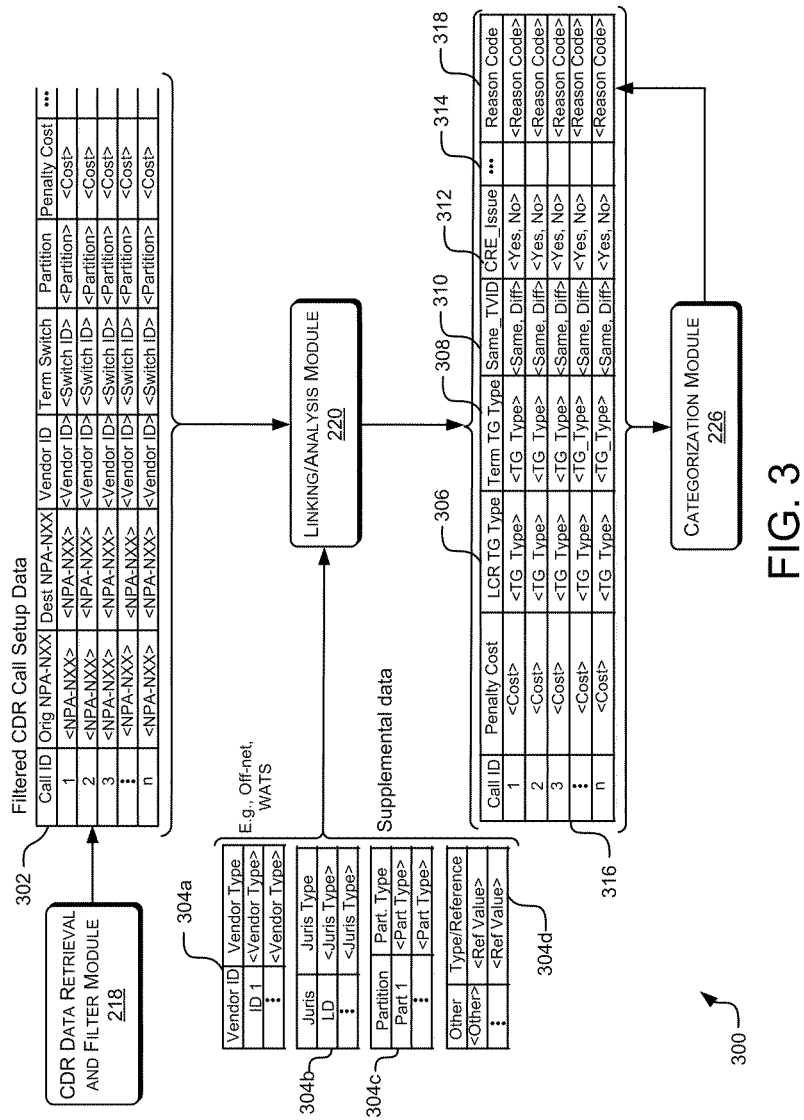

FIG. 3 illustrates an example scheme for gathering CDR call termination data, linking the CDR call termination data to supplemental data to generate interim analysis data, and generating a reason code for each call entry that has an associated penalty cost.

Figure 4:
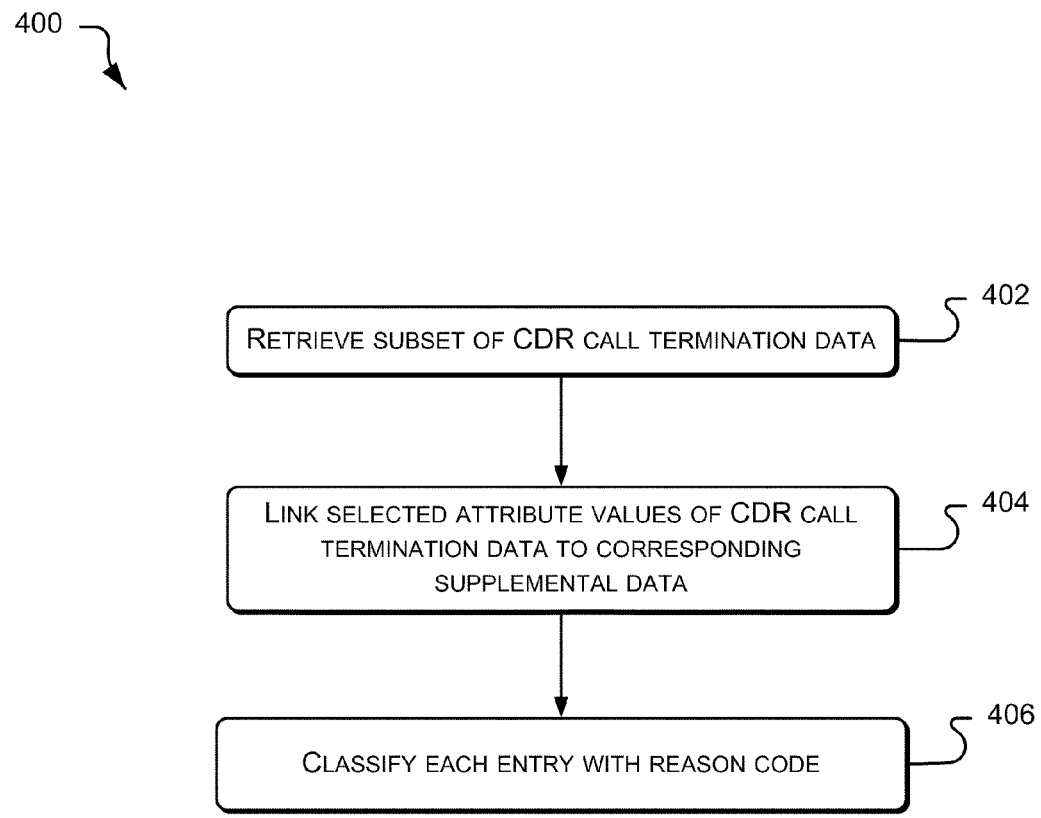

FIG. 4 is a flowchart illustrating a process for gathering CDR call data, linking the call data to supplemental call data, and categorizing penalty costs associated with calls identified in the CDR call data.

Figure 5:
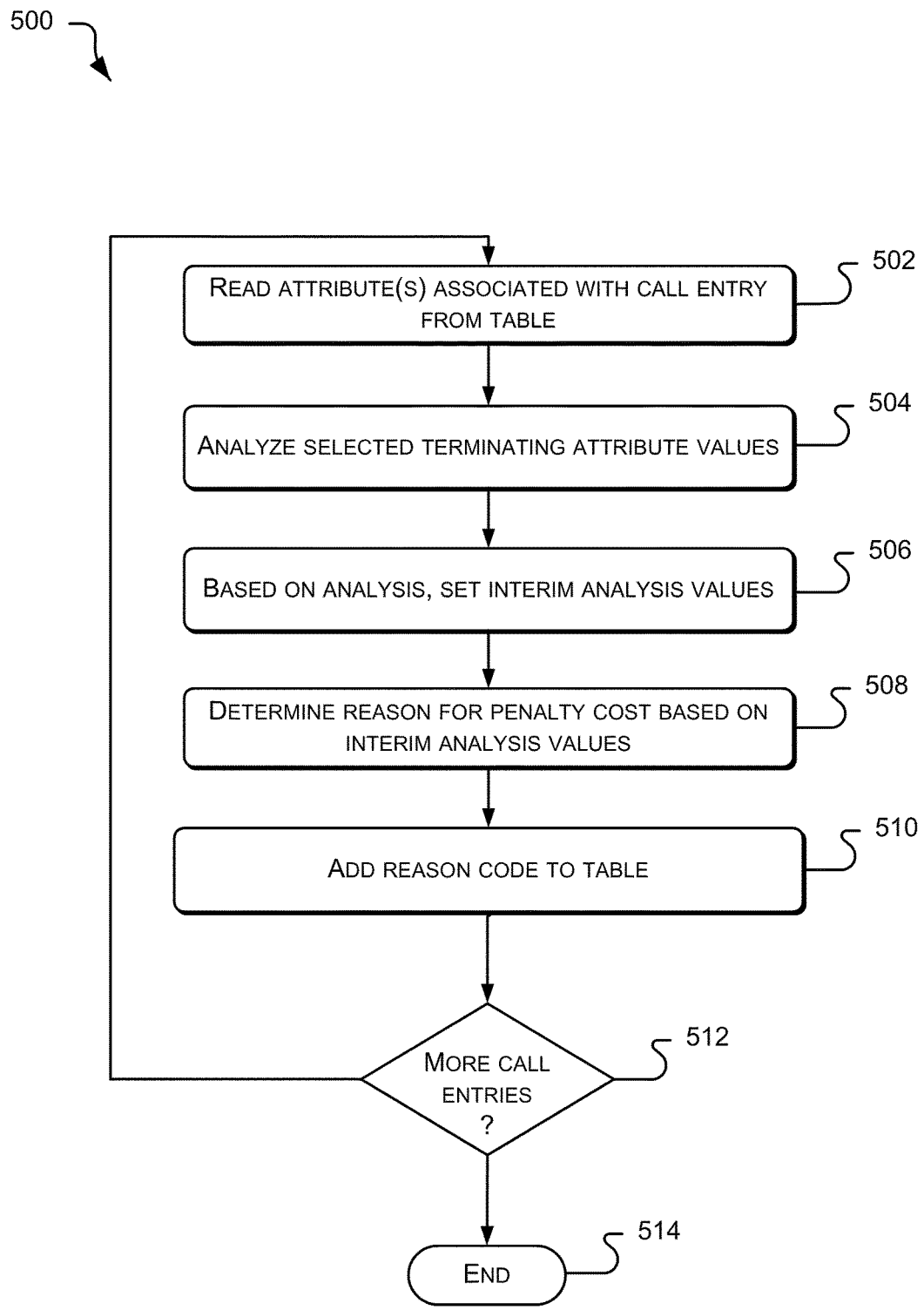

FIG. 5 is a flowchart illustrating a process for categorizing penalty costs associated with calls setup across a network.

Figure 6:
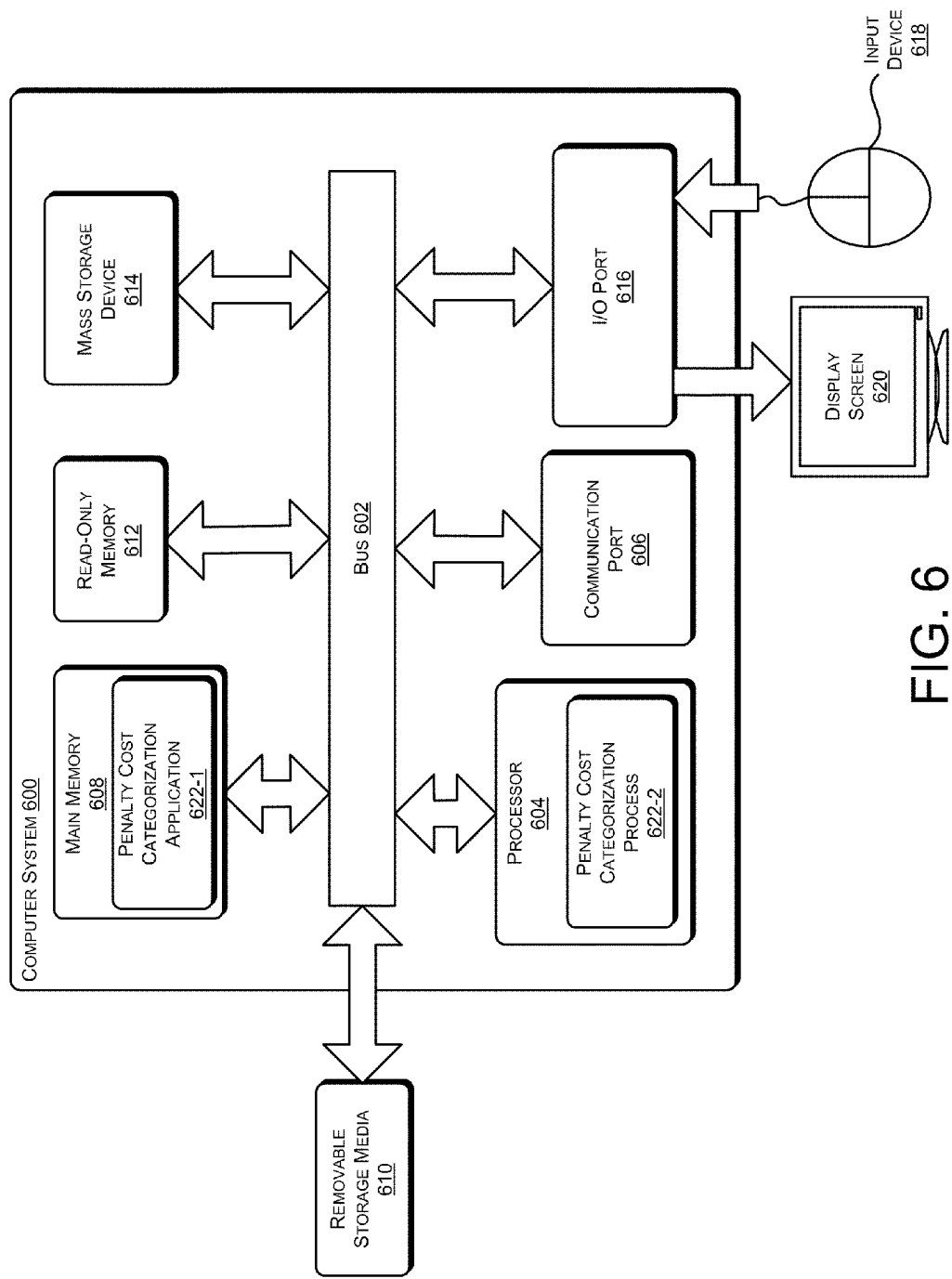

FIG. 6 is an example block diagram of a computer system configured with a penalty cost categorization application and process according to embodiments herein.

DETAILED DESCRIPTION

Embodiments of systems and methods presently disclosed generally relate to categorizing penalty costs associated with calls. More specifically, embodiments relate to identifying penalty costs generated in response to setting up calls in a network and determining one or more reasons for the penalty costs. Further still, embodiments relate to generating one or more reports of penalty costs. Further yet, embodiments relate to notifying specified personnel of the penalty cost report(s).

In communications networks that set up calls between originating and destination endpoints (or between other networks that set up calls), there may be numerous routes that each call could take to reach the destination endpoint (e.g., called number). The route selection may be based on numerous factors, such as route availability at the time the call is placed, as well as preconfigured settings in network devices, such as switches, that set up the call. The network devices, or network elements, are configured in advance to set up calls along certain routes, such as trunks, or to certain vendor networks. The routing configurations of network elements may designate a number of routes in order of priority. The order of the routes is typically set in advance and may be based on business considerations, such as vendor agreements and route costs.

Call routing information is available in the form of call detail records (CDRs) generated by network elements. CDRs typically include the calling number, the called number, the charged number, the call duration, terminating switch, terminating vendor identifier (ID), and other data. There may be tens, hundreds or more network elements in a network that generate CDRs describing each call, or a leg of each call. The CDR data indicates the route over which each call was set up. Based on the indicated route, it can be determined whether a penalty cost is incurred for each call. However, given only the CDR data, it is not immediately apparent why a call was routed the way it was routed. As a result, based solely on the CDR data, one would not be able to determine why a penalty cost was incurred for a given call.

There are numerous reasons why a penalty cost might be incurred. The reasons are typically related to business and network administration considerations. For example, a call may be set up over a business partner network (e.g., a subsidiary network, co-carrier network), which may actually cost more than another route, but because the network is a business partner there is a business reason (e.g., an operating agreement) for why the call was set up over the more costly route. As another example, a network element or communication channel (e.g., a trunk) may fail, thereby necessitating re-routing of calls over more costly routes. This example may be referred to as a "blocking condition", in which calls are blocked from the least cost routes.

Embodiments of the present invention relate to systems and methods for determining the reasons why penalty costs are incurred. Various embodiments involve gathering at least a portion of collected CDR data, linking CDR data entries to supplemental data (e.g., business data, administrative data, operations data), and determining therefrom a reason for each penalty cost. Embodiments further include classifying each penalty cost by a reason code, which indicates the reason for the penalty cost.

Embodiments include a number of categories into which penalty costs can be classified. Categories include, but are not limited to, channel blocking, network element configuration problem, overflow on a communication channel, forced route and reporting problem. The categorized penalties can be used to generate one or more reports that can be used by network management personnel to better assess network performance. Penalty cost categorization reports can further be sent to appropriate personnel by various means, including, but not limited to, email or text messaging.

Figure 1:
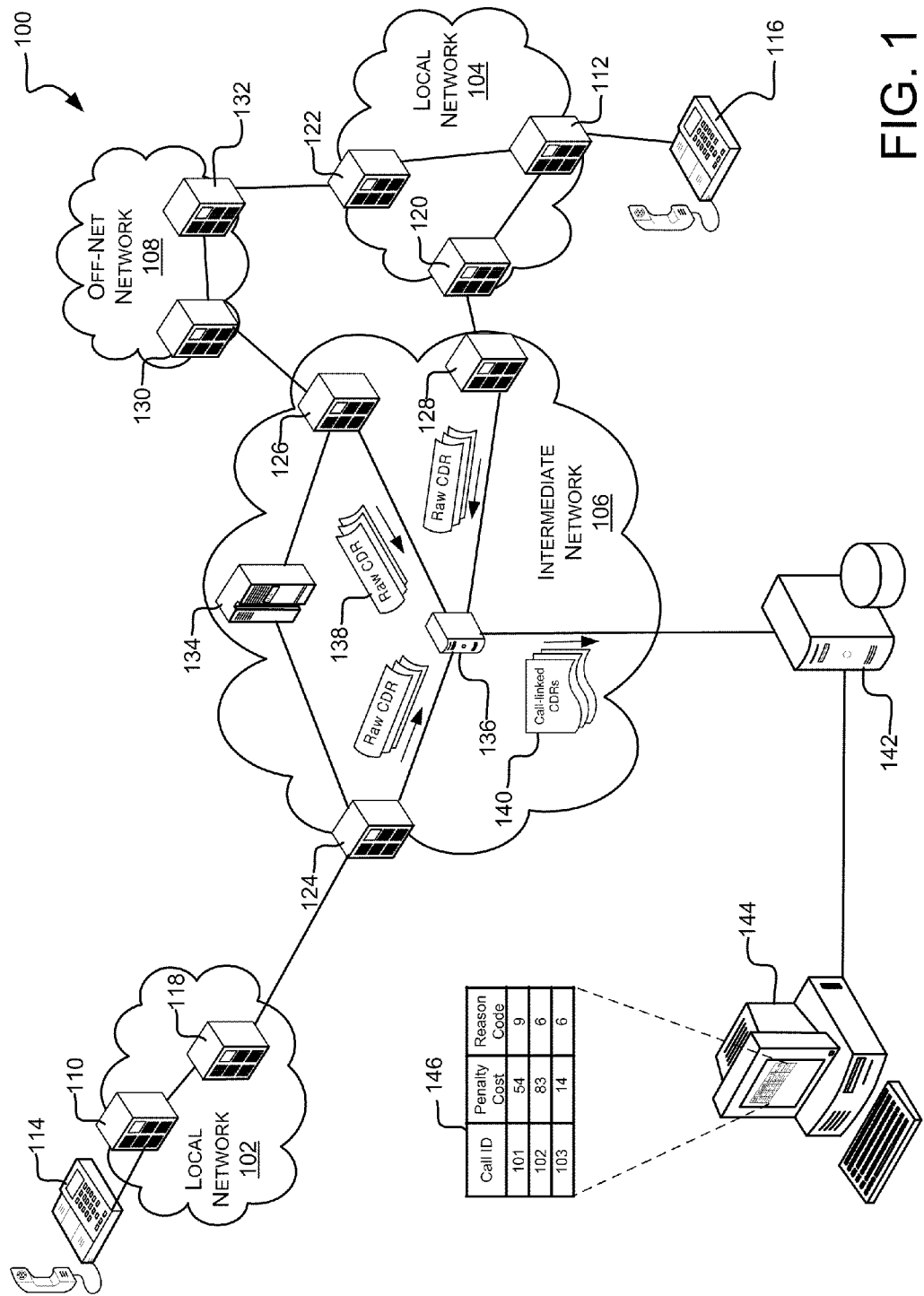
FIG. 1 illustrates an example network environment suitable for setting up calls, gathering call detail record (CDR)

Penalty cost categorization and example applications are described with respect to an example operating environment, such as a network environment 100, shown in FIG. 1. The network environment 100 includes a number of distinct networks, such as a first local network 102, a second local network 104, an intermediate network 106 and an off-net network 108. In general, the intermediate network 106 sets up calls between the first local network 102 and the second local network 104, and may use the off-net network 108 to facilitate call setup.

First local network 102 and second local network 104 serve as call origination and destination networks. For example, first local network 102 and second local network 104 have network elements, such as local exchange 110 and local exchange 112, which are typically located at end offices (not shown) that are proximate to communication endpoints, such as telephone 114 and telephone 116. Although the communication endpoints 114 and 116 are illustrated as desktop telephones, it will be appreciated that communication endpoints 114 and 116 may be any communication device configured to connect to local networks 102 and 104, respectively. By way of example, but not limitation, communication devices may include cell phones, voice over IP phones, soft phones (i.e., computer-based phones) or others.

Local networks 102 and 104 also include other network elements, such as switch 118 and switch 120, respectively, for routing calls to, and receiving calls from, the intermediate network 106. Switch 118 and switch 120 may be, for example, Class 4 or tandem switches, which are typically configured for interconnection with other networks. In addition, a local network, such as local network 104 may include other switches, such as switch 122, which can route calls to, and receive calls from, the off-net network 108.

Sometimes calls being set up by the intermediate network 106 are set up indirectly to local network 104 via the off-net network 108. Off-net network 108 may be owned and managed by a vendor of call routing services. The vendor may have agreements with the owner of the intermediate network 106, whereby calls are routed to the off-net network 108. Like other calls set up through the intermediate network 106, such off-net routing of calls is recorded in CDRs as discussed further below.

As mentioned earlier, the intermediate network 106 sets up calls through the network 106 between the local networks 102, 104 and/or off-net network 108. To perform call setup, the intermediate network 106 includes network elements, such as switch 124, switch 126 and switch 128. Switch 124, 126 and 128 may be Class 5 or softswitches, as are known in the art. As such, switch 124, 126, and 128 handle call control and signaling associated with setting up calls. Switch 124, 126, and/or 128 can typically allow for, or provide, one or more other functions related to call setup, including protocol conversion (e.g., between packet switched and circuit switched), centralized control of multiple switching platforms, Quality of Service (Qos) and Grade of Service (GoS).

The intermediate network 106 typically spans a geographic area larger than the geographic area spanned by the local networks 102 and 104. The intermediate network 106 may be a long-haul network, for example. In this regard, the intermediate network 106 includes a geographically distributed infrastructure of network elements and channels (e.g., fiber optic cables, copper wire and/or others) for carrying call signaling data over potentially large distances. As such, the intermediate network 106 is operable to set up calls between multiple local regions or metropolitan areas. Local network 102 and local network 104 may, for example, be situated in or around distinct metropolitan areas, where local network 102 and local network 104 can handle local call origination and termination (i.e., setup).

To further illustrate, the first local network 102 may be situated in the Atlanta metropolitan area and the second local network 104 is situated in the Boston metropolitan area. In this case, the intermediate network 106 could facilitate setting up calls between Atlanta and Boston, and vice versa, by routing calls from the first local network 102 (or the second local network 104) to the second local network 104 (or the first local network 102). For example, a call setup request received at switch 124 from switch 118 may be sent to switch 128. From switch 128, the call setup request can be sent to switch 120, which can send the call setup request to end office switch 112, which can terminate the call. During actual operation, intermediate network 106 would span, and facilitate call setup among, many more local metropolitan areas than are shown in FIG. 1.

Continuing with the prior example call setup, a call setup request received by switch 124 from switch 118 may be sent to switch 126. From switch 126, the call setup request can be sent to another network element, such as switch 130 of the off-net network 108. The switch 130 can send the call setup request to another switch 132 in the off-net network 108, which can terminate the call from the off-net network 108 to switch 122 of the local network 104. The call setup request can then be sent to switch 112, which can terminate the call to the endpoint 116.

Terminating a call refers to setting up a final leg (the egress leg) of a call before the call leaves a network. The switch device that handles the termination of the call from the network is referred to as the terminating switch. In this regard, for example, when switch 128 sets up call to switch 120, switch 128 is considered the terminating switch associated with setting up the call by the intermediate network 106. As such, in general when a call egresses the intermediate network 106 from switch 124, 126 or 128 to another network, the switch 124, 126 or 128 from which the call egresses the network 106 is considered the terminating switch associated with that call, with respect to the intermediate network 106.

For ease of illustration, FIG. 1 only shows a few network elements in each network. In actual operation, there are typically many more network elements and potentially numerous channels between the various networks. When the intermediate network 106 is setting up a call, a channel (e.g., a trunk) and a terminating switch are selected for setting up the call to another network. The selection of the terminating switch and channel are made based on route settings configured on the network elements. Different channels may have different call setup costs associated with them. For example, it may cost more to route a call directly to local network 104, rather than routing the call indirectly through off-net network 108. The cost premium associated with routing a call via a more costly route is referred to as a penalty cost.

In one embodiment, network elements in the intermediate network 106 are configured using a core routing engine (CRE) 134. The CRE 134 is a network element with memory and processing capability to manage routing among network elements within the network 106. The CRE 134 is configured with one or more route plans that associate terminating area code/local exchange codes (designated by NPA-NXX, which are the first six digits of a ten digit telephone number) with route labels that identify one or more routes that can be used for setting up calls to the terminating NPA-NXX.

The route plans in the CRE 134 can be organized according to partitions. A partition can be associated with a service level or customer service plan or jurisdiction used in routing calls. Partitions, route plans and configuration of the CRE 134 are discussed in detail in copending US Patent Publication No. 2009/0074173 and US Patent Publication No. 2009/0080630 both entitled "LOCAL ROUTING MANAGEMENT IN A TELECOMMUNICATIONS NETWORK", which have common assignee and which are both incorporated herein by reference for all purposes.

According to one embodiment, configuration data (e.g., route plans) from the CRE 134 are propagated to network elements (e.g., switch 124, switch 126 and switch 128) of the intermediate network 106. The network elements then set up calls according to the configuration data. When a network element sets up a leg of a call, the network element generates a call detail record (CDR) that includes a number of details about the call leg, such as the origination number, destination number, destination switch, and others. CDRs are constantly being created as call legs are set up.

In one embodiment, CDRs generated by the network elements are sent to a CDR collector 136. The CDRs sent to the CDR collector 136 include CDR data that is referred to as raw CDR data 138. The raw CDRs 138 from different network elements may be associated with different legs of the same call. The CDR collector 136 links CDRs related to different legs of the same call to generate a CDR related to the entire call. In this manner, CDRs related to the same calls are combined into call-linked CDRs 140. The CDR collector 136 may be a server computer or other computing device configured to link CDR data that is related by call.

Call-linked CDRs 140 are sent to a CDR capture point, such as CDR capture server computer 142. CDR capture server computer 142 gathers CDR data from the call-linked CDRs 140 and organizes CDR data in tables, for example in a database. As is discussed further below with reference to FIG. 2, the CDR data tables are composed of many rows of CDR data, with each row including CDR attributes for a given call. Each call is assigned a call identifier (ID) associated with each call entry in the tables.

CDR data may be captured by the CDR capture server 142 repeatedly, on a substantially periodic basis, such as daily, weekly, bi-weekly, or otherwise. In one embodiment, the CDR capture server 142 captures CDR data 140 on a specified day each month. In this particular embodiment, over a month time period, hundreds of thousands or millions of calls may have been set up by network elements of the intermediate network 106. The CDR data at the CDR capture server 142 is unrefined, meaning that the data is not organized or formatted in a way that allows for quick and easy understanding of aggregated results of call routing through the network. In part because CDR data is listed on an individual call basis at the CDR capture server 142, a user would typically find it very difficult to discern the impact of how calls were routed during the prior given time period (e.g., week, month, etc.) on a larger scale. For example, a user would have difficulty understanding why a penalty cost was incurred for a call that was not set up on the least cost route.

Furthermore, the CDR data tables of the CDR capture server 142 are additionally difficult to read and understand for impact analysis because each call entry includes many (e.g., tens or hundreds) CDR attributes that are not necessarily important to a given analysis. The inclusion of many CDR attributes in the CDR data tables by the CDR capture server 140 can make quick and/or effective analysis of the data difficult if not impossible. In particular, the unrefined CDR data at the CDR capture server 142 alone is not sufficient to determine why penalty costs are incurred. Embodiments described below provide supplementing the unrefined CDR data with business and operations related data and categorizing penalty costs on the basis of reason codes that indicate why least cost routes were not selected and why penalty costs were incurred.

In one embodiment, a penalty cost categorization and reporting computer 144 retrieves selected CDR attribute values from the CDR data capture server 142. The penalty cost categorization and reporting computer 144 is configured to supplement selected CDR data with business and operations related data relevant to penalty costs. The penalty cost categorization and reporting computer 144 may be further configured to categorize penalty costs identified in the CDR data. The penalty cost categorization and reporting computer 144 can further generate penalty cost categorization reports 146 and notify appropriate personnel of the penalty cost categorization data. Example embodiments of the penalty cost categorization process, report generation process, and notification process are discussed further hereinbelow with reference to FIGS. 2-6.

The lines connecting various devices (e.g., network elements or servers) in FIG. 1 are intended only to indicate that there is some form of communication link between the devices to assist in illustration, and do not imply any particular type of communication technology. The lack of a line between any two devices does not necessarily mean there is not a communication link between the devices. Indeed, there may be communication between numerous devices that are not connected with a line in FIG. 1. For example, in one embodiment, the CDR capture server 140 communicates with the CRE 134 to configure route plans associated with an optimal cost routing matrix (OCRM), which can be generated by the CDR capture server 140.

FIG. 2 illustrates a system 200 configured to capture call detail record (CDR) setup data, supplement selected CDR call setup data, and categorize penalty costs based on the supplemented CDR data. The system 200 includes an electronic cost routing administrator 202 and an electronic penalty cost categorization system 204. In addition to performing various cost routing functions (discussed further below), the cost routing administrator 202 serves as a CDR capture point by receiving call-linked CDR data (e.g., CDR data 140 (FIG. 1)) from one or more CDR data generators, such as switches (e.g., switch 124, 126, or 128 (FIG. 1)) and/or intermediate collection points (e.g., 136 (FIG. 1)) within a network (e.g., network 106 (FIG. 1)). The cost routing administrator 202 may correspond to the CDR data capture server 142 of FIG. 1, but this is not necessarily the case in some embodiments.

In the illustrated embodiment, the cost routing administrator 202 includes a CDR data store 206, a data store interface 208, variable cost routes 210, a cost routing matrix generator 212, an optimal cost routing matrix 214 and a network element interface 216. As mentioned, the cost routing administrator 202 performs cost routing functions including generating an optimal cost routing matrix (OCRM) 214 and interfacing with one or more network elements, via the network element interface 216, to configure the OCRM 214 in routing plans, for example on the CRE 134 (FIG. 1).

In this regard, the cost routing matrix generator 212 reads variable cost routes 210 and determines and/or prioritizes routes according to costs and various business logic/rules related to called numbers or NPA-NXX's (i.e., area code/local exchange code pairs). The variable cost routes 210 include routes for calls to egress the network, along with associated variable costs. The variable cost routes 210 may be based on numerous factors such as vendor rate sheets, tariffs, and/or others. In one embodiment, the OCRM 214 that is generated by the cost routing matrix generator 212 is a mapping of all NPA-NXX's to preferred routes on the basis of variable costs.

In one embodiment, the network element interface 216 communicates data from the optimal cost routing matrix 214 to one or more network elements, such as the CRE 134, to thereby configure the network element(s) to setup calls according to the matrix 214. The network element interface 216 also captures call-linked CDR data (e.g., call-linked CDR data 140) from one or more network elements. The capturing of CDR data from network elements may occur substantially periodically, such as weekly or monthly. The captured CDR data is stored in the CDR data store 206.

In one embodiment, the CDR data received by the network element interface 216 is stored in tables in the CDR data store 206. After the CDR data is stored, the data store interface 208 can retrieve data from the data store 206 in response to requests for data. For example, as further discussed below, CDR data in the data store 206 may be requested by a CDR data retrieval and filtering module 218 of the electronic penalty cost categorization system 204. For example, the data store interface 208 may respond to structured query language (SQL) commands, or other commands, to retrieve data from the CDR data store 206.

In one embodiment, the electronic cost routing administrator 202 can apply costs to, or determine costs associated with, calls identified in the captured CDR data and include the costs in the CDR data store 206. Although the data in the CDR data store 206 includes cost data and route data, the call entries in the CDR data store 206 do not include sufficient data to determine reason(s) why a least cost route was not selected (if it wasn't) or why a penalty cost was incurred if a penalty cost was incurred.

Therefore, the electronic penalty categorization and reporting system 204 provides functionality for classifying or categorizing penalty costs. As mentioned earlier, the CDR data retrieval and filtering module 218 interfaces with the data store interface 208 to retrieve selected CDR data. The CDR data retrieval and filtering module 218 does not need to retrieve all the call entries or all the attributes of the call entries. For example, in one embodiment, only call entries in the CDR data store 206 that have associated penalty costs are retrieved. Among those call entries, only a selected set of attributes are retrieved, such as the origination NPA-NXX, the destination NPA-NXX, the terminating switch identifier, the vendor ID, jurisdiction, originating partition and terminating partition.

In the illustrated embodiment, the electronic penalty cost categorization and reporting system 204 also includes a linking and analysis module 220, supplemental data 222, classification data 224, a categorization module 226, a user interface 228, categorized penalty cost data 230, penalty cost report generator 232, and a notification module 234. In general, the linking/analysis module 220 links retrieved call entries with associated supplemental data 222 to facilitate classification of penalty costs. Categorization module 226 then uses the linked supplemental data and filtered CDR call setup data to determine reasons why penalty costs might have been incurred.

In one embodiment, the supplemental data can include reference and/or type data that are descriptive of attribute values that can be in the CDR data. For example, vendor types can be assigned to vendors that are identified in the CDR data; jurisdiction types can be assigned to various jurisdictions identified in the CDR data; and partition types can be assigned to partitions included in the CDR data.

The categorization module 226 stores reason codes in association with call IDs in the categorized penalty cost data 230. By assigning a reason code to each call ID that has an associated penalty cost, the categorization module 226 classifies the penalty cost according to one of a number of different categories of reasons. The categorized penalty cost data 230 can be used by the penalty cost report generator 232 to develop one or more penalty cost reports.

In one embodiment the penalty cost report generator 232 is operable to generate numerous different types or styles of reports, including more or less data. The penalty cost reports may be adapted to particular groups of network personnel, such as management, technicians, or others, within the network company. In various embodiments, a user can interact with the penalty cost report generator 232 via the user interface 228 to prepare different styles of reports.

In an embodiment, the notification module 234 is operable to notify personnel of penalty cost information. The notification module 234, for example, can send penalty cost reports to network personnel via email. For example, email messages including penalty cost reports may be sent to network operations, management, engineering or others. Network personnel can use the penalty cost categorizations to quickly determine whether changes can or should be made to further improve network performance. For example, based on the penalty cost reports, network operations personnel may determine that one or more network elements (e.g., CRE 134) are configured incorrectly and should be reconfigured. As another example, network personnel may determine that additional trunk groups should be added to one or more other networks.

FIG. 3 illustrates an example scheme 300 for gathering CDR call termination data, linking the CDR call termination data to supplemental data to generate interim analysis data, and generating a reason code for each call entry that has an associated penalty cost. The approach illustrated in FIG. 3 employs the CDR data retrieval and filter module 218, the link module 220 and the categorization module 226 shown in FIG. 2.

In one embodiment, the CDR data retrieval and filter module 218 retrieves CDR call setup data from a set of CDR data (e.g., CDR data 206) gathered from one or more CDR data collectors and/or network elements. The CDR data retrieval and filter module 218 may filter the retrieved data to obtain only call entries that have associated penalty costs, and may further filter the data to include only selected attribute values. The filtered CDR call setup data 302 is stored and is used by the linking/analysis module 220.

In one embodiment, the linking/analysis module 220 links selected attribute values to supplemental data in order to classify the selected attribute values. By classifying the selected attribute values, reasons for penalty costs can be determined as discussed further below.

In one embodiment, supplemental data is stored in one or more supplemental data tables 304. For example, linking/analysis module 220 may link a "Vendor ID" attribute value to a "Vendor Type" using supplemental data table 304*a*. As another example, supplemental data table 304*b* may be used to classify jurisdiction according to jurisdiction type. As yet another example, supplemental data table 304*c* may be used to classify partitions by partition types. Other supplemental data tables 304*d* may be included. Although FIG. 3 illustrates numerous supplemental data tables 304, in other embodiments, the supplemental data tables may be merged into one table.

In one embodiment, based on the linked supplemental data, the linking/analysis module 220 generates interim analysis values that are used in penalty cost categorization. For example, the linking/analysis module 220 may generate LCR trunk group types 306 and actual terminating trunk group types 308 for each call ID. As another example, the linking/analysis module 220 may determine whether a sequence 1 vendor is the same as the terminating vendor ID and generate a "Same_TVID" indicator 310 for each call ID.

As yet another example, linking/analysis module 220 may generate a "CRE_issue" indicator 312 for each call ID, indicating whether a penalty cost is the result of a configuration problem with the CRE. Other interim analysis values 314 may be generated. The interim analysis values are stored in an interim analysis table 316, where they can be used by the categorization module 226 to categorize penalty costs.

In one embodiment, the categorization module 226 reads the interim analysis values and, based on those values, determines a reason for each penalty cost. Some example reasons for penalty costs include blocking conditions, overflow, network element misconfiguration, or vendor agreements (i.e., because of a vendor agreement, calls are set up on routes to a vendor that are not the least cost routes). The categorization module 226 stores reason codes 318 in the table 316. Each reason code 318 indicates the reason for the penalty cost associated with the call ID.

FIG. 4 is a flowchart illustrating a process 400 for gathering CDR call data, linking the call data to supplemental call data, and categorizing penalty costs associated with calls identified in the CDR call data. The process 400 may be carried out by the electronic penalty cost categorization system 204 of FIG. 2, or a similarly configured system.

In a retrieving operation 402 a subset of CDR call termination data is retrieved from a set of CDR data (e.g., CDR data 206, FIG. 2) collected from one or more network elements. The retrieving operation 402 may involve filtering a set of CDR data to obtain only CDR call entries that have associated penalty costs, and may further involve filtering out unwanted attribute values.

In a linking operation 404, selected attribute values of the subset of CDR call termination data are each linked to associated supplemental data. The supplemental data may serve to classify attribute values according to certain types. For example, the vendor ID attribute value may be classified as a particular vendor type. As another example, the partition attribute value may be classified as a particular partition type. In one embodiment the linking operation 404 uses the supplemental data to generate interim analysis values for use in classifying penalty costs.

In a classifying operation 406, each penalty cost is classified by a reason code. An example embodiment of a classifying operation 406 is shown in FIG. 5 and discussed below. In one embodiment, the classifying operation 406 stores each reason code in a table (e.g., interim analysis table 306, FIG. 3) in association with the call ID.

FIG. 5 is a flowchart illustrating a penalty cost classification process 500 according to one embodiment. In general, the classification process 500 includes an initial analysis of CDR call termination data attributes, followed by a determination of a reason for the penalty cost based on the analysis of call termination data attributes. The penalty cost classification process 500 may execute automatically or the data refining process 500 may be carried out by the electronic penalty cost categorization system 204 of FIG. 2, or a similarly configured system. The process 500 uses CDR data that has been gathered from network elements and organized on an individual call basis (e.g., a CDR call entry for each individual call) in call entries of one or more tables, such as call attribute table 302 (FIG. 3).

In a reading operation 502, one or more call attribute values are read from the CDR call attribute table. In one embodiment the attribute values are read from call entries that have associated penalty costs, as determined by the electronic cost routing administrator 202, or similar system. The attributes that are read are the ones used in the analysis performed in subsequent steps. For example, terminating vendor ID, originating partition, and terminating partition, among others, may be read. An analyzing operation 504 then analyzes the selected attribute values that were read from the CDR call attribute table.

Analyzing operation 504 may perform a number of different analyses. For example, in one embodiment, the least cost routing trunk group facility type is compared with the actual terminating trunk group facility type. As another example, it is determined whether the sequence 1 vendor matches the terminating vendor ID. As yet another example, originating partition and terminating partition are checked to determine whether there is a configuration problem related to the core routing engine. The analyzing operation 504 uses supplemental data to perform the analysis. Supplemental data includes business, administrative and network operations data. Analyzing operation 504 associates CDR call termination attributes with attributes of the supplemental data. The analysis can be used to yield other interim values that can be used to determine the reason for the penalty cost.

A setting operation 506 sets interim analysis values based on the analysis of the selected CDR call attribute values. The interim values can be stored in a table, such as penalty cost analysis table 306, where they can be used to classify the penalty cost for each call. To further illustrate embodiments of the analyzing operation 504 and the setting operation 506, several example portions of software are shown below. The following software sections make use of Structured Query Language (SQL) calls to one or more supplemental data tables (e.g., supplemental data tables 304a, 304b, 304c, 304d) and a CDR call termination data table 302.

The following software section can be used to determine whether the actual terminating trunk group facility type corresponds to least cost routing trunk group facility type. The least cost routing trunk group facility type can be determined by accessing a vendor ID/vendor type table, such as supplemental data table 304a (FIG. 3). Interim values lcr_tg_fac_type and term_tg_fac_type are set based on the analysis:

```
SELECT lcr_trunk_group.status lcr_tg_status,
CASE
    WHEN lcr_vendor.vendor_type = 'Co-Carrier'
        AND lcr_trunk_group.fac_type = 'WAT'
        THEN 'TDM'
    WHEN lcr_trunk_group.fac_type = 'FGD'
        THEN 'TDM'
    ELSE lcr_trunk_group.fac_type
END lcr_tg_fac_type,
term_trunk_group.status term_tg_status,
CASE
    WHEN term_vendor.vendor_type = 'Co-Carrier'
        AND term_trunk_group.fac_type = 'WAT'
        THEN 'TDM'
    WHEN term_trunk_group.fac_type = 'FGD'
        THEN 'TDM'
    ELSE term_trunk_group.fac_type
END term_tg_fac_type
```

The following software section can be used to analyze whether the call was set up on a sequence 1 trunk group for the terminating vendor. The sequence 1 trunk group is a preferred trunk group for the vendor, and there may be numerous less preferred, or higher cost trunk groups associated with the terminating vendor. The software section shown below determines if the sequence 1 vendor matches the terminating vendor and, if so, sets an interim value "same_tvid" to the value 'SAME TVID'; if not, then same_tvid is set to "DIFFERENT TVID':

```
CASE
    WHEN seq1_vndr = tvid
        THEN 'SAME TVID'
    ELSE 'DIFFERENT TVID'
END same_tvid,
```

As yet another example of the analyzing operation 504 and the setting operation 506, the following software section can be used to determine whether a configuration problem exists with the core routing engine and set an interim value 'cre_issue' if a configuration problem is detected. The analysis is based on the jurisdiction as well as the originating and terminating partitions of the call:

```
CASE
    WHEN cdr_switch_partition_code IN
                                    ('014', '001', 'BASE')
        AND (orig_partition.partition_type LIKE 'BASE%'
        OR orig_partition.partition_type LIKE 'W%')
        THEN ''
    WHEN cdr_switch_partition_code IN('014','001',
'BASE')
        AND jurisdiction_decoded != orig_juris.jurisdiction
        THEN 'CRE ISSUE'
    WHEN cdr_switch_partition_code NOT IN ('014',
'001', 'BASE')
        AND jurisdiction_decoded != term_juris.jurisdiction
```

```
            THEN 'CRE ISSUE'
        ELSE ''
        END cre_issue
```

A determining operation 508 determines a reason for the penalty cost based on the interim values of the setting operation 506. To illustrate, an example portion of software is shown below:

```
/* Check for Overflow */
IF term_lata LIKE '8%'
    THEN
        IF best_choice = 'SEQUENCE 1' AND penalty_cost_flag = 1
        THEN
            reason_code_desc := 'WilTel International Forced First
(International Bridge Trunk)';
        ELSIF best_choice='OVERFLOW'    /* OVERFLOW Logic */
        THEN
            IF seq1_vendor_type = tvid_vendor_type AND
                seq1_facility_type = tvid_facility_type AND
                penalty_cost_flag = 1
            THEN
                reason_code_desc := 'WilTel International Forced
First (International Bridge Trunk)';
            ELSE
                reason_code_desc := 'Overflow';
            END IF;
        END IF;
    -- 1.2 : Moved in from #8 Check
    ELSIF    UPPER(orig_partition_type) = 'WILTEL DMS (W2W)'
    THEN
        reason_code_desc := 'Lack of WilTel DMS Routing';
/* Check Transit trunks */
    ELSIF seq1_vendor_type LIKE 'TRANSIT'
    THEN
        IF best_choice='OVERFLOW' AND tvid_vendor_type not
like 'TRANSIT'
        THEN
            reason_code_desc := 'Overflow';
        ELSIF tvid_vendor_type like 'TRANSIT' AND
penalty_cost_flag=0
        THEN
            reason_code_desc := 'Regular Call
Flow'||no_penalty_desc;
        ELSIF tvid_vendor_type like 'TRANSIT' AND
penalty_cost_flag=1
        THEN
            reason_code_desc := 'Vero Reporting Issue
(Transit)'||no_penalty_desc;
        ELSIF best_choice = 'SEQUENCE 1' and tvid_vendor_type
not like 'TRANSIT' AND
            penalty_cost_flag=0
        THEN
            reason_code_desc := 'Overflow';
        ELSIF best_choice = 'SEQUENCE 1' and tvid_vendor_type
not like 'TRANSIT' AND
            penalty_cost_flag=1
        THEN
            reason_code_desc := 'Vero Reporting Issue
(Transit)'||no_penalty_desc;
        END IF;
/* Check On-net Bridge trunks */
    ELSIF seq1_vendor_type LIKE 'BRIDGE%ON%'
    THEN
        reason_code_desc := 'On-Net Bridge Trunks Forced
First'||no_penalty_desc;
/* Check Enhanced Partition */
    ELSIF    term_partition LIKE '%!_E!_%' ESCAPE '!'
    THEN
        IF best_choice = 'SEQUENCE 1' AND penalty_cost_flag = 1
        THEN
            reason_code_desc := 'Lack of Enhanced Routing';
        ELSIF best_choice='OVERFLOW'    /* OVERFLOW Logic */
        THEN
            IF tvid_vendor_type LIKE 'OFF-NET WATS' AND
                seq1_vendor_type LIKE 'OFF-NET WATS'
```

```
            THEN
                reason_code_desc := 'Overflow';
            ELSIF seq1_vendor_type = tvid_vendor_type AND
                seq1_facility_type = tvid_facility_type AND
                penalty_cost_flag = 1
            THEN
                reason_code_desc := 'Lack of Enhanced Routing';
            ELSE
                reason_code_desc := 'Overflow';
            END IF;
        END IF;
/* 6th Check - Local Partition */
    /* V1.3 */
    ELSIF upper(term_partition) IN
('LOCAL_O','VLOCO','LOCAL_P', 'VLOCP')
    THEN
        IF best_choice = 'SEQUENCE 1' AND penalty_cost_flag = 1
        THEN
            reason_code_desc := 'Lack of Local Routing';
        ELSIF best_choice='OVERFLOW' /* OVERFLOW Logic */
        THEN
            IF seq1_vendor_type = tvid_vendor_type AND
                seq1_facility_type = tvid_facility_type AND
                penalty_cost_flag = 1
            THEN
                reason_code_desc := 'Lack of Local Routing';
            ELSE
                reason_code_desc := 'Overflow';
            END IF;
        END IF;
```

In the above code section, a number of example penalty cost reasons are shown. For example, some reasons for penalty costs are "Overflow", "Lack of Local Routing", "Lack of Enhanced Partition" and "On-net bridge trunks forced first". The "On-net bridge trunks forced first" reason relates to forcing a call onto an on-network provider network even though the on-network route may not be the least cost route; this may occur, for example, as a result of network provider contracts. The determined reason is associated with a reason code that is added to the analysis table in adding operation 510.

A query operation 512 then checks if more call entries are in the CDR table. If so, the query operation 512 branches "YES" back to reading operation 502 where the next CDR attribute values are read. If not, the query operation 512 branches "NO" to end operation 514, where the process 500 ends.

FIG. 6 is a schematic diagram of a computer system 600 upon which embodiments of the present invention may be implemented and carried out. For example, one or more computing devices 600 may be used to retrieve and filter call detail record (CDR) data, link CDR data entries to supplemental data and/or classify penalty costs associated with the CDR data. Computer system 600 generally exemplifies any number of computing devices, including general purpose computers (e.g., desktop, laptop or server computers) or specific purpose computers (e.g., embedded systems).

According to the present example, the computer system 600 includes a bus 602 (i.e., interconnect), at least one processor 604, at least one communications port 606, a main memory 608, a removable storage media 610, a read-only memory 612, and a mass storage 614. Processor(s) 604 can be any known processor, such as, but not limited to, an Intel® Itanium® or Itanium 2® processor(s), AMD® Opteron® or Athlon MP® processor(s), or Motorola® lines of processors. Communications ports 606 can be any of an RS-232 port for use with a modem based dial-up connection, a 10/100 Ethernet port, a Gigabit port using copper or fiber, or a USB port. Communications port(s) 606 may be chosen depending on a network such as a Local Area Network (LAN), a Wide Area Network (WAN), or any network to which the computer system 600 connects. The computer system 600 may be in communication with peripheral devices (e.g., display screen 630, input device 618) via Input/Output (I/O) port 616.

Main memory 608 can be Random Access Memory (RAM), or any other dynamic storage device(s) commonly known in the art. Read-only memory 612 can be any static storage device(s) such as Programmable Read-Only Memory (PROM) chips for storing static information such as instructions for processor 604. Mass storage 614 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 602 communicatively couples processor(s) 604 with the other memory, storage and communications blocks. Bus 602 can be a PCI/PCI-X, SCSI, or Universal Serial Bus (USB) based system bus (or other) depending on the storage devices used. Removable storage media 610 can be any kind of external hard-drives, floppy drives, (OMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 608 is encoded with penalty cost categorization application 622-1 that supports functionality as discussed herein. For example, a penalty cost categorization application 622-1 can include one or more of the linking/analysis module 220, the categorization module 226, the penalty cost report generator 232 and the notification module 234 of FIG. 2. Penalty cost categorization application 622-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 604 accesses main memory 608 via the use of bus 602 in order to launch, run, execute, interpret or otherwise perform the logic instructions of the penalty cost categorization application 622-1. Execution of penalty cost categorization application 622-1 produces processing functionality in penalty cost categorization process 622-2. In other words, the penalty cost categorization process 622-2 represents one or more portions of the penalty cost categorization application 622-1 performing within or upon the processor(s) 604 in the computer system 600.

It should be noted that, in addition to the penalty cost categorization process 622-2 that carries out operations as discussed herein, other embodiments herein include the penalty cost categorization application 622-1 itself (i.e., the un-executed or non-performing logic instructions and/or data). The penalty cost categorization application 622-1 may be stored on a computer readable medium (e.g., a repository) such as a floppy disk, hard disk or in an optical medium. According to other embodiments, the penalty cost categorization application 622-1 can also be stored in a memory type system such as in firmware, read only memory (ROM), or, as in this example, as executable code within the main memory 608 (e.g., within Random Access Memory or RAM). For example, penalty cost categorization application 622-1 may also be stored in removable storage media 610, read-only memory 612, and/or mass storage device 614.

Example functionality supported by computer system 600 and, more particularly, functionality associated with penalty cost categorization application 622-1 and penalty cost categorization process 622-2 is discussed above with reference to FIGS. 1-5.

In addition to these embodiments, it should also be noted that other embodiments herein include the execution of the penalty cost categorization application 622-1 in processor(s) 604 as the penalty cost categorization process 622-2. Thus, those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer-implemented method for analyzing penalty costs, the method comprising:
retrieving call detail record (CDR) call setup data entries for one or more calls having associated penalty costs;
linking selected attribute values of the CDR call setup data entries to supplemental data;
generating interim analysis values associated with each supplemented CDR call setup data entry; and
based on the interim analysis values, generating a reason code for each CDR call setup data entry, wherein the reason code indicates a reason for the associated penalty cost.

2. The computer-implemented method of claim 1, further comprising generating a penalty cost report including the reason code for each CDR call setup data entry.

3. The computer-implemented method of claim 2, further comprising notifying specified network personnel of the penalty cost report.

4. The computer-implemented method of claim 1, wherein the supplemental data comprises data for classifying attribute values of the CDR call setup data entries.

5. The computer-implemented method of claim 4, wherein the reason codes classify penalty costs in categories comprising one or more of blocking, overflow, vendor agreement, or network element misconfiguration.

6. A system comprising:
   an electronic cost routing administrator configured to gather call detail records (CDRs) from one or more network elements in a network; and
   an electronic penalty cost categorization system comprising:
      a CDR call setup data retrieval and filter system configured to retrieve CDR call setup data from the electronic cost routing administrator and filter the CDR call setup data to include call entries that have associated penalty costs;
      an analysis module configured to generate interim analysis data characterizing a reason for each penalty cost; and
      a categorization module configured to use the interim analysis module to generate a reason code indicating the reason for each penalty cost.

7. The system of claim 6, wherein the electronic penalty cost categorization system further comprises a penalty cost report generator configured to generate one or more reports showing the reason codes associated with each penalty cost.

8. The system of claim 7, wherein the electronic penalty cost categorization system further comprises a notification module configured to notify specified personnel of the one or more reports.

9. The system of claim 6, further comprising supplemental data configured for use in classifying selected attribute values of the filtered CDR call setup data.

10. The system of claim 7, further comprising a user interface configured to enable a user to specify formats of the one or more penalty cost reports.

11. A computer program product comprising a non-transitory, computer-readable medium storing computer-executable instructions, which, when executed, cause a computer to perform a process, the process comprising:
    gathering call detail records (CDRs) from a plurality of network elements;
    filtering selected data from the CDRs, wherein filtering comprises retrieving one or more CDR entries that have an associated penalty cost;
    linking selected attributes of the retrieved CDR entries to predetermined analysis values relevant to determining reasons for penalty costs; and
    based in part on the interim analysis values, categorizing each of the one or more penalty costs according to reason codes indicating reasons for each of the one or more penalty costs.

12. The computer program product of claim 11, wherein the process further comprises:
    generating a report including the one or more penalty costs and their associated reason codes; and
    sending the report to selected personnel.

13. The computer program product of claim 11, wherein the reason codes indicate reasons selected from a group comprising blocking, overflow, configuration problem, reporting problem and a forced routed.

14. The computer program product of claim 11, wherein linking selected attributes to predetermined analysis values comprises determining business logic types for the selected attributes.

15. The computer program product of claim 11, wherein the predetermined analysis values comprise vendor type, partition type and jurisdiction type.

* * * * *